United States Patent [19]

Chassagnette et al.

[11] Patent Number: 4,583,426
[45] Date of Patent: Apr. 22, 1986

[54] CONTINUOUS TORQUE TRANSMISSION WITH MANUAL TRANSMISSION AND CONVERTER

[75] Inventors: Clément Chassagnette, Lozanne; Philippe Quemerais, Thurins, both of France

[73] Assignee: Renault Vehicules Industriels, Lyons, France

[21] Appl. No.: 625,850

[22] Filed: Jun. 28, 1984

[30] Foreign Application Priority Data

Jun. 28, 1983 [FR] France ............................. 83 10642

[51] Int. Cl.[4] ............................................. F16H 47/08
[52] U.S. Cl. .................................... 74/733; 74/740; 192/3.58
[58] Field of Search .............. 192/87.14–87.17, 192/48.1, 48.9, 48.91, 3.23, 3.24, 3.27, 3.58; 74/733, 740, 752 B, 752 C

[56] References Cited

U.S. PATENT DOCUMENTS

| | | | |
|---|---|---|---|
| 2,568,007 | 9/1951 | Jandasek | 74/732 |
| 2,720,298 | 10/1955 | Youngren | 192/99 A |
| 2,739,487 | 3/1956 | Winther | 74/330 |
| 3,303,914 | 2/1967 | Richards | 192/87.17 |
| 3,691,861 | 9/1972 | Sturmer | 74/330 |
| 3,805,640 | 4/1974 | Schneider et al. | 192/3.58 X |
| 3,834,499 | 9/1974 | Candellero et al. | 192/3.58 X |
| 3,861,241 | 1/1975 | Hancock | 74/73 B |
| 4,095,486 | 6/1978 | Ohnuma | 74/733 X |
| 4,282,957 | 8/1981 | Sugimoto et al. | 74/740 |
| 4,314,487 | 2/1982 | Ahlen | 74/740 X |
| 4,422,353 | 12/1983 | Suga et al. | 192/3.58 X |
| 4,468,988 | 9/1984 | Hiramatsu | 192/3.58 X |
| 4,480,499 | 11/1984 | Kubo et al. | 74/740 X |

FOREIGN PATENT DOCUMENTS

| | | | |
|---|---|---|---|
| 2025296 | 12/1971 | Fed. Rep. of Germany | 74/733 |
| 58-37369 | 3/1983 | Japan | 74/733 |

Primary Examiner—Rodney H. Bonck
Assistant Examiner—Dwight G. Diehl
Attorney, Agent, or Firm—Oblon, Fisher, Spivak, McClelland & Maier

[57] ABSTRACT

Continuous torque transmission, particularly for motor vehicles, comprising a manual transmission (3), driven by a combustion engine (1) by a torque converter (2). This torque transmission comprises a double clutch (4) whose movement inputs are connected to the turbine (9) of said torque converter (2), and whose first movement output is connected to the input of the transmission (3), and whose second movement output is connected to any point of the kinematic chain of said torque transmission, while remaining downstream from the input shaft of the transmission.

2 Claims, 2 Drawing Figures

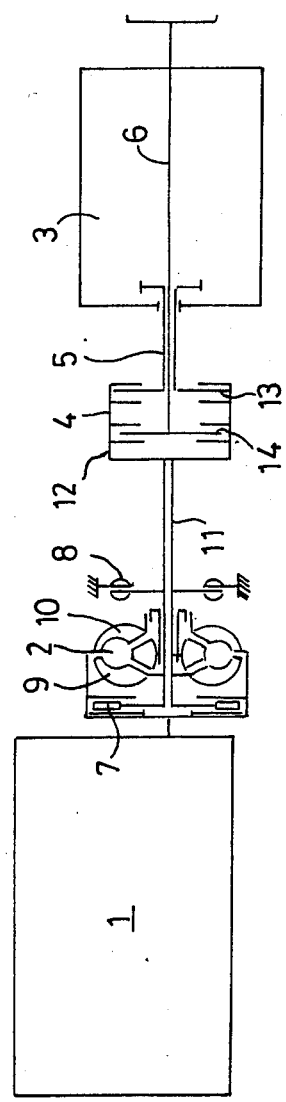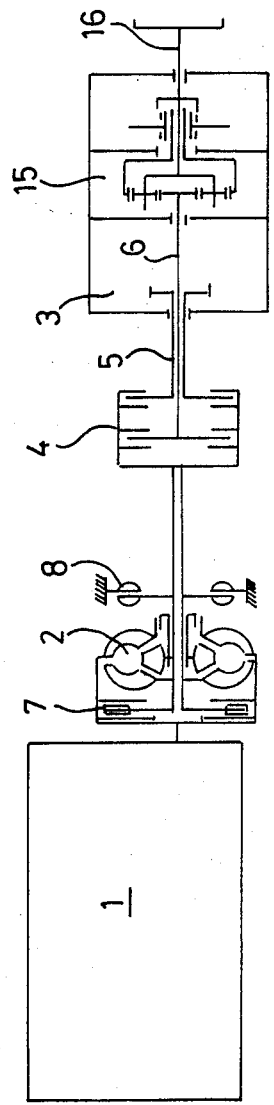

CONTINUOUS TORQUE TRANSMISSION WITH MANUAL TRANSMISSION AND CONVERTER

BACKGROUND OF THE INVENTION

1. Field of the Invention

This invention relates to a continuous torque transmission having a torque converter and providing torque during shifting of gears.

One of the best known means to solve this problem of continuous torque transmission during shifting is that of the automatic transmission. From the economic viewpoint this solution has the drawback of requiring putting well lapped means in place and, for the user, the drawbacks of weight and efficiency.

Another torque transmission device has been developed which relates to the use of a converter ahead of the manual transmission. This is well known and, in particular, makes it possible to assure the phases of starting and reclutching during shifting in a perfect way, which is not the case with a single dry friction clutch, all the more so since the use in parallel of a clutch locking the converter makes it possible not to lose efficiency.

This system thus realized still has a drawback: the interruption of the torque (engine or brake) transmitted to the wheels during shifting. This is reflected by a loss of efficiency and mobility in the general case and is a hinderance to automation of shifting. Actually, in this latter case, since the automatic device cannot take all factors of the environment into account, no matter how sophisticated the automatic device may be, there will always be cases where shifting be ill-timed for the driver. This interruption in torque transmission can even present a danger. To illustrate this point, the case can be considered of a vehicle passing on an incline and where the automatic device shifts to a higher gear. The interruption of torque during the necessary fraction of a second handicaps the vehicle and makes the maneuver dangerous. In this case, only palliatives such as locking of the shifting can be used.

SUMMARY OF THE INVENTION

The purpose of this invention is therefore to achieve a torque transmission device for a standard manual transmission and torque converter which operates without interruption of torque during shifting.

For this purpose, the invention has as its object a continuous torque transmission, particularly for motor vehicles, comprising a manual transmission driven via a combustion engine by a torque converter. This torque transmission according to the invention comprises a double clutch whose movement inputs are connected to the turbine of said torque converter, and whose first movement output is connected to the transmission input, and whose second movement output is connected at any point of the kinematic chain of said torque transmission, while remaining downstream from the input shaft of said transmission.

According to an embodiment of the invention, the second movement output of the double clutch is connected to the movement output of the transmission.

According to an embodiment of the invention, the second movement output of the double clutch is connected to the movement input of a range box, said range box being located downstream from said transmission.

According to an embodiment of the invention, the double clutch consists of a double movement input housing connected to the turbine shaft, a receiving unit solid with the first movement output and a receiving unit solid with the second movement output.

These receiving units can be multidisk clutches operating in oil.

According to an embodiment of the invention, the torque converter comprises a locking clutch device directly connecting the pump to the turbine of said converter.

According to an embodiment of the invention, a retarder is mounted on the turbine shaft.

According to an embodiment of the invention, the process of controlling the torque transmission, during shifting, comprises the following steps:
  opening of the clutch of the first movement output;
  closing of the clutch of the second movement output;
  actual shifting of gears;
  opening of the clutch of the second movement output;
  closing of the clutch of the first movement output; to maintain the torque on the vehicle wheels.

According to an embodiment of the invention, the transmission can be controlled automatically.

The torque transmission according to the invention offers the following advantages:

Maintaining of the transmission torque during shifting, hence a gain in efficiency, mobility and safety.

Maintaining of all the advantages of the manual transmission, of the converter, and in case it is provided, a better use of the retarder connected to the converter.

Possible automation of the system because there is no interruption in the torque and thus completely comparable to a standard automatic transmission.

The advantage in comparison with an automatic transmission is the high number of gears that can be achieved.

The converter connection with the manual transmission also makes it possible to have close ratios with few gears, the opening being obtained by the converter. By improving starting possibilities, this makes it possible to have close transmission ratios, optimizing of the running of the engine for fuel consumption without having too many gears, just as in the case of a standard automatic transmission.

The torque transmission according to the invention further offers the advantage of combining a standard manual transmission with the advantage which this solution offers from the viewpoint of gear stepping, efficiency, cost and weight. All these characteristics are well known to manufactures and users which make the solution of the manual transmission the most universally used. On the other hand, the torque transmission according to the invention offers all the advantages of the converter, namely, increased torque at starting, flexibility at slow speeds and a reduction of reclutchings. Finally, the torque transmission according to the invention offers the advantages of the combination of a manual transmission and converter, which makes it possible to have a very large opening with few gears and close ratios. Now, the few gears are advantageous from the economic viewpoint and the number of maneuvers to be performed, and the close transmission ratios make it possible to optimize the engine running conditions, therefore, to improve consumption.

Further, the torque transmission according to the invention, assuring a transmission of continuous engine torque or brake torque, offers the possibility of having a gain in efficiency, a gain in performance and a gain in safety, and a possible automation of shifting just as in standard automatic transmissions.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows the diagram of a first embodiment of a torque transmission according to the invention;

FIG. 2 shows the diagram of a second embodiment of a torque transmission according to the invention.

DETAILED DESCRIPTION OF THE PREFERRED EMBODIMENTS

FIG. 1 shows a first embodiment of a torque transmission according to the invention. This torque transmission comprises a manual transmission 3 driven by a combustion engine 1 by a torque converter 2. The torque coverter receives the movement on its pump 10 and sends it to turbine 9. Further, torque converter 2 comprises a locking clutch device 7 directly connecting pump 10 to turbine 9 of the converter. The movement leaves by turbine shaft 11 which drives a double clutch 4. A retarder 8 is mounted on this turbine shaft 11. Double clutch 4 consists of a double movement input housing or drive member 12 connected to shaft 11 of turbine 9. This double clutch also includes a driven member 25 receiving unit 13 and a driven member 25 receiving unit 14. Receiving unit 13 is connected to the first movement output, i.e., to the input shaft 5 of transmission 3. Receiving unit 14 is connected to the second movement output, i.e., it is solid with output shaft 6 of transmission 3.

Receiving units 13 and 14 are multidisk clutches of the type used in automatic transmissions and operating in oil.

FIG. 2 shows a second embodiment of the torque transmission according to the invention. This torque transmission comprises a manual transmission 3 driven by a combustion engine 1 by a torque converter 2. As in the case of FIG. 1, this device also has a locking clutch device 7 for torque converter 2. It also has a retarder 8 mounted on turbine shaft 11. Double clutch 4 is constituted in the same way as in FIG. 1, i.e., it comprises a double movement input housing 12 connected to shaft 11 of turbine 9, and two receiving units 13 and 14 which are multidisk clutches operating in oil.

As in the case of FIG. 1, receiving unit 13 is solid with movement input shaft 5 in manual transmission 3. On the other hand, receiving device 14 is solid with the output shaft of the transmission, said output shaft 6 of transmission 3 is the movement input shaft of a range box 15. Range box 15 is located immediately downstream from transmission 3 and mounted on it. Range box 15 can be of any known type such as a sun and planet gear. The torque transmission movement leaves by output shaft 16.

For these two figures, the retarder can be achieved by the converter itself or be separate in a distinct element 8. This retarder can be embodied by known technologies such as electric means, by eddy currents, hydraulic means, dry friction, etc.

Shifting is performed according to the following operating principle: to assure shifting, converter 2 not being locked, the following operations are performed:
 1. opening or releasing of clutch 13,
 2. and simultaneously closing or engaging of clutch 14,
 3. actual shifting of gears,
 4. opening of clutch 14,
 5. and simultaneously closing of clutch 13.

This way of proceeding makes it possible to release the gears in the transmission during shifting and to assure the continuity of the torque on the output shaft of the transmission.

According to a general embodiment of the invention, double clutch 4 always has a first movement output which is connected to the input of transmission 3, and has a second movement output which is connected at any point of the kinematic chain of said torque transmission, while remaining downstream from the input shaft 5 of said transmission 3. In the case of FIG. 2, the second movement output of double clutch 4 is connected to the input of range box 15. In this case, during change of range, there will be no effect of maintaining the torque. However, this corresponds to very infrequent maneuvers and where the vehicle speed is generally very slow. This does not handicap the vehicle.

Control of this torque transmission according to the invention, whether it be the embodiment shown in FIG. 1 or the embodiment shown in FIG. 2, can also be controlled automatically, as is well known in standard automatic transmissions.

Obviously, numerous modifications and variations of the present invention are possible in light of the above teachings. It is therefore to be understood that within the scope of the appended claims, the invention may be practiced otherwise than as specifically described herein.

We claim:
1. A process for controlling a continuous torque transmission having a torque converter, a manual transmission and a double clutch with a driving member connected to said torque converter and with first and second driven members, said first driven member being connected to an input of said manual transmission, said second driven member being connected to any point of the kinematic chain of said torque transmission downstream of said manual transmission input, said process comprising the steps of:
 releasing said first driven member to terminate torque transmission to said input;
 engaging said second driven member to initiate torque transmission to said any point;
 shifting gears of said manual transmission;
 releasing said second driven member to terminate torque transmission to said any point; and
 engaging said first driven member to initiate torque transmission to said input.

2. The process of claim 1 wherein said torque transmission includes a range box immediately downstream of said manual transmission and wherein said any point is an input of said range box.

* * * * *